United States Patent [19]

Dumazeau

[11] Patent Number: 5,094,692
[45] Date of Patent: Mar. 10, 1992

[54] GAS IMPERMEABLE COATING FOR A REFRACTORY ARTICLE

[75] Inventor: Claude Dumazeau, Maubeuge, France

[73] Assignee: Vesuvius Crucible Company, Pittsburgh, Pa.

[21] Appl. No.: 524,645

[22] Filed: May 16, 1990

[30] Foreign Application Priority Data

May 22, 1989 [FR] France ................................ 89 066

[51] Int. Cl.$^5$ ............................................. C04B 35/14
[52] U.S. Cl. .................................. 106/286.8; 501/66; 106/287.34
[58] Field of Search ................ 501/66, 100; 266/285; 106/286.8, 287.34

[56] References Cited

U.S. PATENT DOCUMENTS

| | | | |
|---|---|---|---|
| 1,817,245 | 8/1931 | Freed | 501/100 |
| 4,102,694 | 7/1978 | Sasaki et al. | 501/100 X |
| 4,307,197 | 12/1981 | Daniel et al. | 501/100 |
| 4,326,040 | 4/1982 | Kaji et al. | 501/100 |
| 4,386,164 | 5/1983 | Moser | 501/66 |
| 4,424,281 | 1/1984 | Jones | 501/100 |
| 4,585,485 | 4/1986 | Shikano et al. | 501/100 |

Primary Examiner—William R. Dixon, Jr.
Assistant Examiner—Lisa M. Schull
Attorney, Agent, or Firm—Webb, Burden, Ziesenheim & Webb

[57] ABSTRACT

Coating impermeable to air at the operating temperatures applied on a piece of refractory material for the continuous casting of steel so as to reduce the aspiration of air due to the permeability of the refractory. This coating is preferably comprised of viscous phases at the operating temperature of the piece of refractory material.

3 Claims, 2 Drawing Sheets

GAS IMPERMEABLE COATING FOR A REFRACTORY ARTICLE

BACKGROUND OF THE INVENTION

The pieces of refractory material used for the continuous casting of molten metals, notably steel, are used to protect the stream of molten metal flowing from the ladle toward the distributor from direct contact with the air. These refractory pieces are subjected to a substantial thermal shock at the beginning of the casting, as well as erosion and chemical corrosion by the molten steel and the slag. They are then manufactured into materials capable of resisting this aggressive environment. The materials most used are fused silica and graphitized alumina or a composite material of graphitized alumina and graphitized zirconia. The first material is used basically because of this exceptional resistance to thermal shock, but it has limitations with regard to its erosion resistance for certain types of steel. The second material is much used because it permits longer casting times with aggressive steels.

Although the use of pieces of refractory materials, notably stream protection tubes, has considerably improved the quality of steels by avoiding direct contact of the molten metal stream with the air, a problem of air aspiration through the permeability of the material persists due to the aspiration effect that occurs in the runner under the effect of a rapid flow of the stream of liquid metal. This aspiration of air has the effect of oxidizing the molten metal and leading to the formation of alumina deposits in the runner. These deposits can range up to a complete plugging of the runner and an interruption of the casting. In addition, this air aspiration results in a degradation of the steel quality through the formation of inclusions of oxide and gas bubbles entrained in the stream. These bubbles induce needle-like hole in the billets, blooms or slabs. Another negative effect of air aspiration is to increase the nitrogen takeup in the steel between the ladle and the mold.

Attempts have been made to remedy the above shortcomings by reducing the permeability of refractory materials by the addition of groups of components that produce liquid phases at the operating temperature in order to stop up the pores of the refractory material. Nevertheless, this process has the disadvantage that the liquid phases diminish the hot properties of the refractory material, which results in a higher wear level of the refractory material by the steel and the slag. In view of the fact that attempts are currently being made to increase the service life of the refractory material to permit longer casting sequences, this solution is not acceptable.

The precise purpose of the invention is a coating material designed to be applied to a piece of refractory material for the continuous casting of steel that remedies the problem of the negative effect of air aspiration on the refractory material on which it is applied and, in particular, without reducing its resistance to erosion.

To this end, the invention concerns a coating applied to a piece of refractory material for the continuous casting of steel, characterized in that it is impermeable to air so as to reduce air aspiration due to permeability of the refractory.

The coating material is preferably comprised of viscous phases at the operating temperature of the piece of refractory material.

According to a first preferred embodiment example, the refractory material of the invention comprises an aqueous suspension containing about 30-85 wt. % of a finely divided constituent chosen among fused silica grains, alumina powder, zirconia powder, mullite powder and alumina droplets, about 0-10 wt. % of a ceramic charge chosen among the fibers of alumina silica, zirconia fibers, titanium dioxide fibers, fibers of chromium alumina, alumina droplets and zirconia droplets, about 15-30 wt. % water, 0-7 wt. % binder chosen among sodium hexametaphosphate, sodium silicate and acrylic resins, and 0-40 wt. % of a generating frit of glass.

A second example of preferred embodiment of a coating according to the invention essentially presents the following composition by wt.: 50-80% $SiO_2$, 5-15% $Al_2O_3$, 5-20% $B_2O_3$, 1-3% $K_2O$, 0-15% $Na_2O$, 0.5-2% $Fe_2O_3$, 0-3% $Co_2O_3/MoO_3$, 1-5% C and 0-1.5% others.

The coating of the invention can be comprised of one or more layers of different materials. For example, it can be comprised of a layer according to the first preferential actualization example, and one or more layers according to the second preferential actualization example. It can also be comprised of several layers of the same material, successively dried before the addition of the following layer. Finally, it is also possible to incorporate a cement layer in the coating.

According to one variant, the coating of the invention has a layer of conventional anti-oxidation glaze on which at least another layer of impermeable material is applied. Finally, the coating can be comprised of a thick layer of dried glaze and then covered with a cement.

The invention also concerns a piece of refractory material having an impermeable coating according to the invention. It also concerns a coating process for a piece of refractory material by means of the said coating. According to this process, a coating is prepared according to the invention and a piece of refractory material is covered with it by means of a brush, by immersion, pressing or by electrodeposition.

EXAMPLE 1

Figure 1:
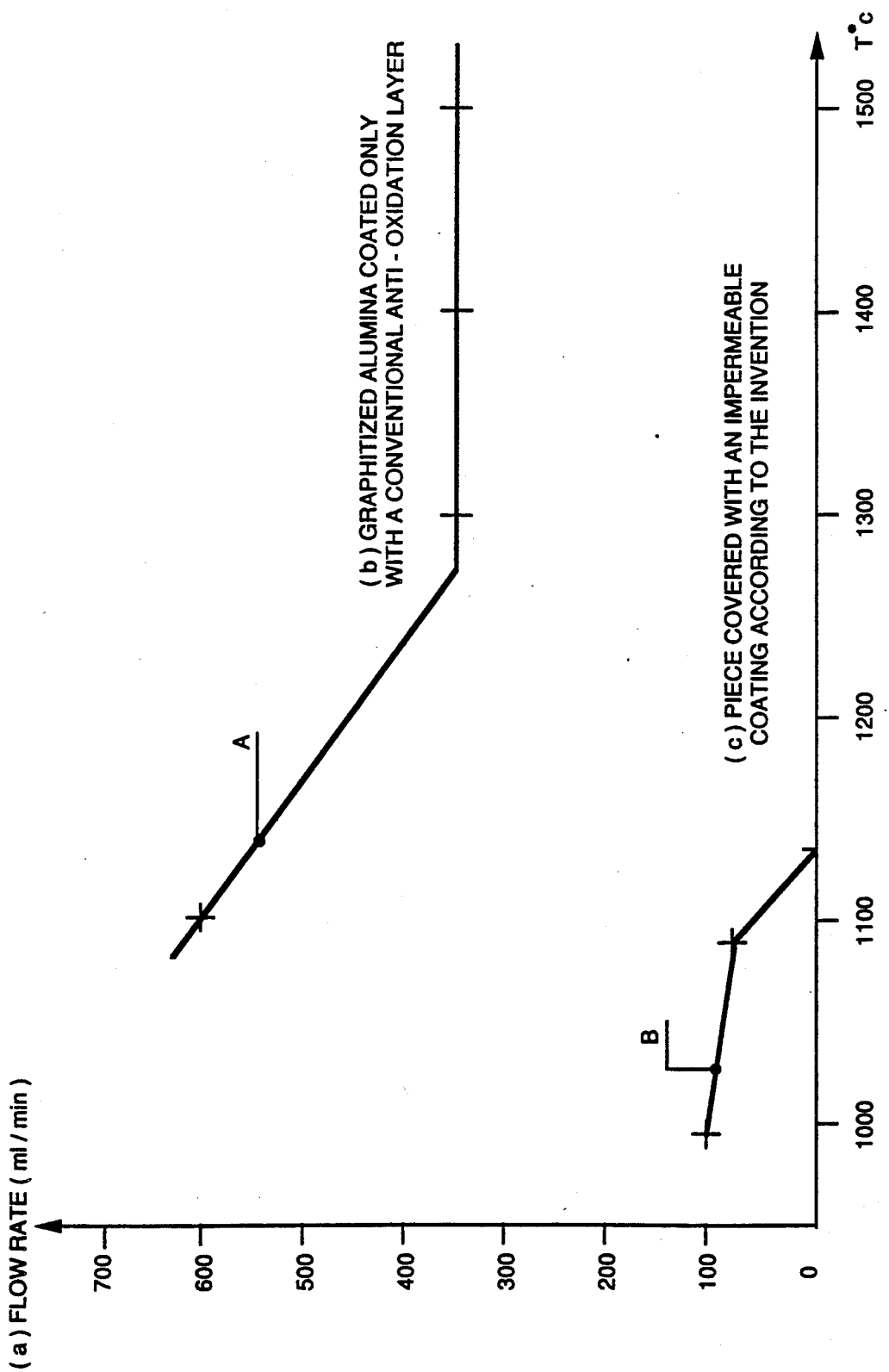
FIG. 1 is a graphic representation of the flow rate of air in milliliters per minute plotted against temperature (°C) through pieces of refractory material covered with a conventional anti-oxidation layer (curve A) and with an impermeable coating according to the invention (curve B).

Two curves are plotted in FIG. 1 for comparison of the permeability of a piece of refractory material of graphitized alumina covered only with a conventional anti-oxidation layer (curve A) and the permeability of a piece of refractory material coated with an impermeable coating according to the invention (curve B). In this example, a coating was used on the basis of fused silica as described in the French Patent No. 8709023, filed on June 26, 1987 and concerning an insulating coating for a refractory body. This coating was applied by immersion. The refractory piece was first coated with a first layer of conventional anti-oxidation glaze. A suspension comprised essentially (by wt.) of 30-85% vitreous silica grains, 0-10% ceramic fibers, 0-7% binder, 0–40% frit and 15–30% water was then applied. After drying, the thickness of the coating layer was between 1 and 2 mm and had the following composition:
96% $SiO_2$
4% $Al_2O_3$.

The density of the material was 1.83 $kg/dm^3$ for an open porosity of 20%.

As can be seen in FIG. 1, due to the use of the coating material according to the invention, the permeability was reduced under the test conditions from about 350 ml/min in the case of the piece of refractory material of graphitized alumina having only one conventional anti-oxidation layer to about 100 ml/min at 1000° C. to be cancelled above 1140° C. and for higher temperatures, for a refractory material of graphitized alumina having the same composition.

According to another actualization example (not shown), the same coating material was applied by electrodeposition. With this process the permeability was reduced to about 35–40 ml/min above 1200° C.

EXAMPLE 2

Figure 2:
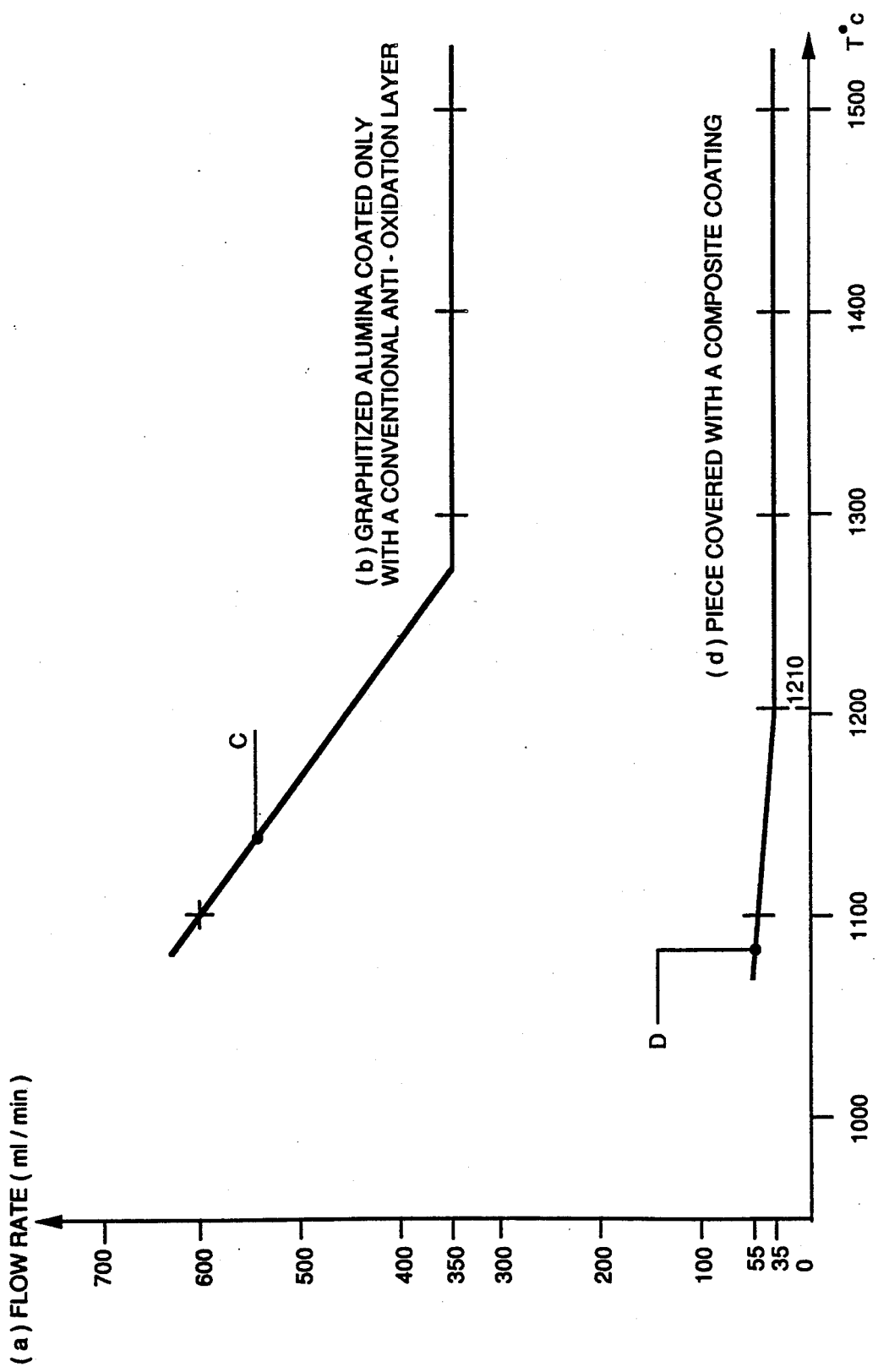
FIG. 2 is a graphic representation of the flow rate of argon in milliliters per minute plotted against temperature (°C) for pieces of refractory material coated with a conventional anti-oxidation layer (curve C) and with a composite coating (curve D).

FIG. 2 plots two curves that give the flow rate in ml/min of argon through pieces of refractory material as a function of the temperature. The first curve, designated by the letter C, is relative to a piece of refractory material of graphitized alumina coated only with a conventional anti-oxidation layer. The second curve, designated by the letter D, refers to a piece of refractory material of the same composition covered with a composite impermeable coating according to the present invention. With regard to curve C, the experimental conditions are the same as in the first example (curve A), the flow rate is the same, i.e., approximately 350 ml/min above 1200° C. It is found that the composite coating (curve D) permits a quite substantial diminution in this permeability. It passes from 350 ml/min to 55 ml/min at 1100° C. and to 35 ml/min at 1210° C. and above.

This layer of composite coating was comprised of a triple layer of glaze, applied by immersion on the refractory before baking and a layer of cement applied with a brush on the glaze layer after baking. The composition of the glaze layer was as follows:
$SiO_2$:56.4%
$B_2O_3$:12.3%
$Al_2O_3$:9.7%
$K_2O$:2.7%
$Na_2O$:10.1%
$Fe_2O_3$:0.8%
$Co_2O_3/MoO_3$:2.0%
C:4.9%

The cement layer had the following composition:
$Al_2O_3$:45.6%
$SiO_2$:48.9%
$Fe_2O_3$:1.2%
$TiO_2$:1.9%
$Na_2O/K_2O$:2.5%

The thickness of the glaze layer was about 0.5 mm and the thickness of the cement layer, about 2 mm. A coating having only three layers of glaze without the addition of a supplementary layer of cement was also tested. This coating exhibited a lesser reduction in permeability that was produced under the same experimental conditions only to 70 ml/min above 1140° C.

In general, the reduction in permeability can be obtained by virtue of a coating that produces viscous phases in the range of operating temperatures. The best results are obtained when the viscosity of the coating is just sufficiently low to permit a closing of its porosity, as well as the porosity of the refractory material. In effect, if the viscosity of the coating material continues to decrease, this coating flows along the walls of the piece. Its thickness diminishes to the point that the layer becomes permeable. A good interval of viscosity is considered to lie between 3000 and 5000 poise for such a coating. The application of a surface layer of refractory cement as mentioned in Example 2 can permit the use of more liquid underlying materials. In effect, the flow of these more liquid materials is rendered difficult by the surface cement.

I claim:
1. Coating applied on a piece of refractory material for the continuous casting of steel, wherein said coating contains viscous phases and is impermeable to air at an operating temperature of the piece of refractory material so as to reduce the aspiration of air due to a permeability of the refractory material, said coating consisting essentially of the following composition, by weight:
   $SiO_2$:50 to 80%
   $Al_2O_3$:5 to 15%
   $B_2O_3$:5 to 20%
   $K_2O$:1 to 3%
   $Na_2O$:0 to 15%
   $Fe_2O_3$:0.5 to 2%
   $Co_2O_3/MoO_3$:0 to 3%
   C:1 to 5%
   Others:0 to 1.5%
and wherein said viscosity is sufficiently low to close pores in the refractory material and is in the range of about 3000–5000 poise.

2. A piece of refractory material for use in the continuous casting of steel having a plurality of layers of an impermeable material applied thereon, each layer comprising a coating which contains viscous phases at an operating temperature of said piece of refractory material said viscosity being sufficiently low to close pores in the refractory material so as to reduce air aspiration during use, the coating consisting essentially of the following composition, by weight:
   $SiO_2$:50 to 80%
   $Al_2O_3$:5 to 15%
   $B_2O_3$:5 to 20%
   $K_2O$:1 to 3%
   $Na_2O$:0 to 15%
   $Fe_2O_3$:0.5 to 2%
   $Co_2O_3/MoO_3$:0 to 3%
   C:1 to 5%
   Others:0 to 1.5%.

3. The piece of refractory material according to claim 1 further including a layer of conventional anti-oxidation glaze on which said layer of impermeable material is applied.

* * * * *